United States Patent [19]

Dunn-Coleman et al.

[11] Patent Number: 4,848,026
[45] Date of Patent: Jul. 18, 1989

[54] COMPOSTING PROCESS FOR THE PRODUCTION OF MUSHROOM CULTIVATION SUBSTRATES

[75] Inventors: Nigel S. Dunn-Coleman, Los Gatos; Thomas J. Michaels, Gilroy, both of Calif.

[73] Assignee: Monterey Mushrooms, Inc., Watsonville, Calif.

[21] Appl. No.: 114,226

[22] Filed: Oct. 26, 1987

[51] Int. Cl.$^4$ .............................................. A01G 1/04
[52] U.S. Cl. .................................................. 47/1.1; 71/5
[58] Field of Search .............................. 47/1.1; 71/5, 9

[56] References Cited

U.S. PATENT DOCUMENTS 1,471,979 10/1925 Richards et al. ........................ 71/9
3,711,372 1/1973 Donnelly ............................... 47/1.1
4,333,757 6/1982 Kurtzman, Jr. ......................... 71/9

FOREIGN PATENT DOCUMENTS 112155 9/1978 Japan ................................... 47/1.1
3052831 3/1988 Japan ................................... 47/1 R Primary Examiner—Deborah L. Kyle
Assistant Examiner—Richard W. Wendtland
Attorney, Agent, or Firm—Richard L. Neeley

[57] ABSTRACT

A process of preparing a mushroom growth medium from a cellulosic material is provided in which the cellulosic material used in the solid-state fermentation process is chemically ammoniated. The chemical ammoniation step reduces composting time, particularly preconditioning time, while providing a compost and a mushroom bed material comparable to that achieved by commercial composting processes, which do not use ammoniated straw.

23 Claims, 1 Drawing Sheet

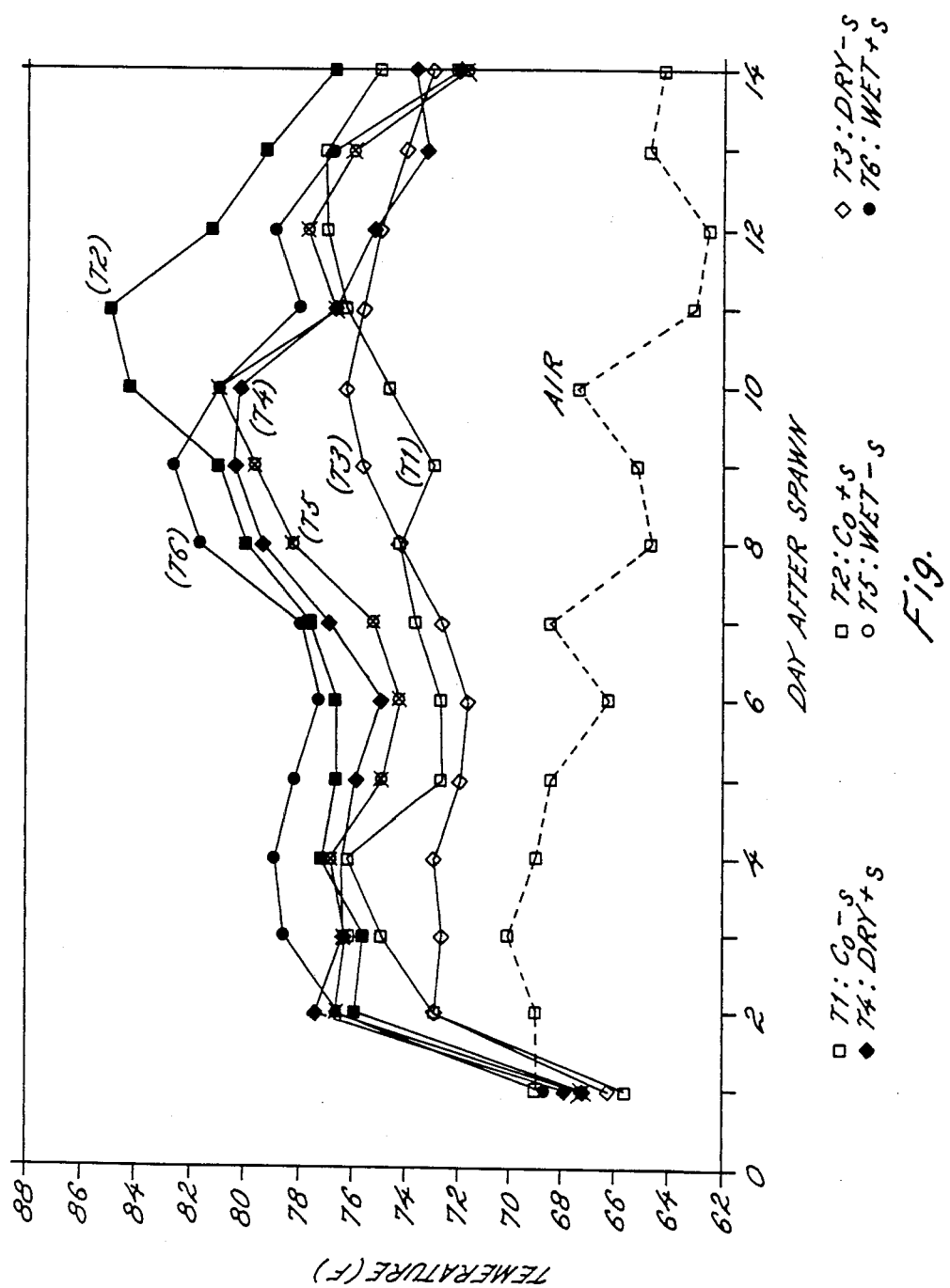

COMPOSTING PROCESS FOR THE PRODUCTION OF MUSHROOM CULTIVATION SUBSTRATES

FIELD OF THE INVENTION

This invention is directed to techniques for the preparation of substrates for use in the cultivation of mushrooms and is particularly directed to growing mushrooms on a compost of defined structure.

BACKGROUND OF THE INVENTION

Although wild mushrooms have been consumed for many centuries, commercial mushroom production is a relatively recent development in the history of agriculture. Commercial mushroom production uses composted vegetable materials as a substrate for supporting the growth of mushrooms, the substrate being prepared in as controlled a manner as possible in order to provide a growth medium favorable for colonization and growth of mushrooms despite the presence of a competing microorganism population. However, the solid-state fermentation composting process itself remains more of an art than a science.

Historically, composting began with straw containing manure obtained from horse stables. Because of the variable condition of stable bedding materials and weather, little advance was made in composting techniques until the beginning of this century. The realization that wheat straw was an important basic constituent as a carbon source and not, as many considered, necessary only for its physical effect on water-holding capacity and aeration was an important step in bringing composting procedures under control. Mushrooms were shown to be grown successfully on so-called synthetic composts prepared from mixtures containing wheat straw as the basic component with additional carbon sources such as corn cobs or brewers grain nitrogen sources such as ammonium nitrate, urea, and calcium cyanamide. The use of inorganic raw materials to replace the nutrients present in horse manure is a key feature in distinguishing a synthetic from a "natural" compost.

Currently there are no standard formulations for the commercial mushroom industry. However, most processes rely on either wheat straw (synthetic compost systems) and/or stable bedding (horse manure compost systems) as the matrix material for the growing substrate. In both systems, an initial preconditioning of the matrix occurs, although under different circumstances. This preconditioning phase is sometimes referred to as a prewetting phase. Horse manure systems rely on the mechanical breakage of straw under the animal's hooves combined with the biological activity that takes place on the stable floor to provide the first steps of breaking down the physical and chemical structure of straw. In the synthetic process, the physical degradation associated with the preconditioning step is carried out by shattering the straw by mechanical means, e.g., using bale-breakers, front-end loaders, and other mechanical devices. In the synthetic systems, after the straw is broken out of bales it is formed into large piles that are moved by large equipment such as front-end loaders. Water and a nitrogen source, typically urea, are added to the straw pile to provide the necessary moisture and nutrient conditions to stimulate microbial activity. Water is added because both bacteria and fungi are not active below approximately 10–13% moisture content. Urea is added because the nitrogen in straw is present in small amounts and is not readily available for biological comsumption. The straw provides the carbon nutrient component in the form of cellulose, hemicelluloses, and waxes. To maintain aerobic fermentation and uniformity, the large piles are turned and moved, usually every other day while adjusting moisture.

During this preconditioning fermentation, microorganisms degrade the straw by virtue of utilizing it as a carobn source. Microbes secrete enzymes that break down celluloses, waxes, and other plant parts into simpler biomolecules such as sugars and fatty acids that are assimilated and readily utilized by the microorganisms. The initial enzymatic degradation results in a softer, more pliable straw that is ready for the next step of the fermentation.

Another result of the fermentation in large piles (typically 10 or more feet high and wide and 40 feet or more in length) is the production of heat as a metabolic by-product along with carbon dioxide and water. The heat, in combination with the insulating nature of the large pile, produces high core temperatures. These temperatures cause non-biological caramelization of carbohydrates and sugars.

Although this initial fermentation prepares the straw for further composting and has been considered essential for preparing a compost that enhances mushroom production, the process is not particularly efficient because of the enormous amount of energy and biomass lost during the process. Typically, 20–30% of the straw is lost as carbon dioxide and water during this initial preconditioning fermentation. This represents a significant portion of the operation's variable cost of production. In some large growing operations, straw costs alone can be several million dollars per year.

In horse manure compost systems, the preconditioning fermentation can be shorter because of the initial breakdown of the straw on the stable floor. However, some initial preconditioning generally is used.

Once preconditioning is complete, the partially composted substrate enters into a stage known as Phase I composting. Because of the standardization of the mechanized equipment used in commercial mushroom production and physical restrictions resulting from the need to retain heat while providing for aerobic fermentation, Phase I composting typically takes place in 6×6' windrows known as ricks that are turned by specially designed heavy equipment to maintain an aerobic, thermophilic fermentation while providing the means to add supplements and water. The supplements typically comprise a wide variety of protein and/or carbohydrate-rich materials which, with water added concurrently, aid in the continued fermentation of the compost. This second fermentation further decomposes the straw and in the process also degrades the supplements added to fuel the process. The objective of this stage of the fermentation is to moderate the fermentation process so that at the end of Phase I mushroom growth will predominate over competing microorganisms in the compost. To accomplish this, the Phase I fermentation is designed to utilize the soluble carbohydrates and proteins present that would readily be available to competing microbes once the compost is spawned with the mushroom. As indications of the depletion of nutrients available to competing microbes, growers typically look for a drop in temperature, straw that is increasingly pliable, and straw caramelization. At the completion of Phase I, the biologically modified straw, supplements, and inactive microbial biomass provide the selective food base on which the mushrooms will later grow.

To finish the composting process, the compost must be pasturized to prevent excessive microbial growth and further must be purged of free ammonia (which is toxic to mushrooms) produced by the degradation by bacteria of nitrogen-containing supplements. This step is also a solid-state fermentation, which is referred to as Phase II. Unlike Phase I, this step is typically accomplished in a specially designed room where environmental conditions can be controlled. Phase I fermentation typically occurs outside either on open concrete pads or on concrete pads with roofs. In Phase II, the addition of external heat initiates compost thermogenesis. Residual nitrogen is either ammonified and driven off or converted into microbial protein. Any residual sugars, fats, and other small molecules are also used by the mostly microbial biomass. At the beginning or (rarely) end of the process, there is a step referred to as peak heating. Heat is introduced into the room to provide temperatures in the compost of about 60° C. for a period of time to accomplish pasturization. This step eliminates insects, nematodes, and competitive fungi that would be detrimental to the mushroom crop. Once Phase II is completed, the compost is ready to be spawned with the mushroom, thus ending the composting process.

There are a number of undesirable features of the prior art composting process as described above. The initial composting typically relies on envionmental microorganisms to carry out the initial fermentation and therefore can be quite variable. It would be desirable to inoculate straw with a defined bacterial population to provide for optimal initial fermentation and uniform results. However, this is difficult because of the presence of environmental organisms. Accordingly, it is difficult to create an assembly line-like process for the preparation of compost, which would reduce production costs.

Additional production costs arise from the degradation and loss of composting material, which can be minimized if the composting time is short. Shortening the composting time also reduces labor and equipment costs required by the constant turning of the large fermentation stacks. However, any shortening of the compost time must be carefully reviewed in view of the product produced. If the fermentation does not consistently produce a substrate suitable for mushroom growth, it will be worthless. Accordingly, if a suitable substrate could be obtained by a shorter fermentation process, the savings in labor, space, and equipment costs would be substantial.

RELEVANT LITERATURE

A general review of the preparation of compost for mushroom cultivation is set forth in Fermor et al., "Compost as a substrate and its preparation", in *The Biology and Technology of the Cultivated Mushroom*, Flegg et al., Eds., John Wiley & Sons, New York, 1985, pp. 81–110. Other aspects of mushroom growing are discussed in other chapters of the same text. Stoller, *Plant Physiol.* (1943) 18:397–414, describes the preparation of synthetic composts for mushroom culture and includes a discussion of the problems that result from the presence of ammonia in the compost.

U.S. Pat. No. 1,471,979 describes the manufacture of nitrogenous fertilizers (not intended for mushroom growth) by fermentation processes employing soluble nitrogen sources and wheat straw. Chemical ammoniation of straw for use in preparing animal feed is described in a number of publications, including Toenjes et as., *California Agriculture*, May–June 1986, 15–17. The manufacturers of commercial ammoniating equipment, such as FMA of Denmark, publish numerous technical handouts describing the ammoniation process that are available from the manufacturers of the ammoniators, including a publication entitled "FMA Ammonia Processor for Straw and Other By-Products", (1984), Flemstofte-Mads Amby Maskinfabriker A/S, Sandvedvej 59 B, 4250 Fuglebjerg, Denmark.

BRIEF DESCRIPTION OF THE DRAWINGS

The FIGURE is a graph showing mushroom bed temperatures at various times after spawn for composts of the invention and comparative composts.

SUMMARY OF THE INVENTION

Accordingly, it is an object of this invention to provide a composting method which reduces the time required for the preconditioning and Phase I fermentation processes, therby reducing costs and increasing efficiency of composting and mushroom production. Additional goals include production of an initially sterile or nearly sterile raw material that can be (1) inoculated with desirable microflora in order to more uniformly produce a mushroom growth substrate or (2) stored without undesired fungal breakdown prior to initiation of the composting process. These and other objects of the invention have been accomplished by using ammoniated wheat straw and/or other cellulosic, lignin-containing materials as the raw material for composting. The ammoniated straw is prepared by a chemical reaction of straw with gaseous ammonia and is not equivalent to prior processes which added soluble nitrogen sources such as urea for utilization by microbes during fermentation. The chemically-modified ammoniated straw is sterilized and degraded by the ammoniation process so that preconditioning and Phase I fermentation times are reduced. A monetary savings is also achieved since ammonia is less expensive than other nitrogen supplements. A uniform growth substrate is therefore provided with considerable savings in labor, raw material, and equipment expense.

DESCRIPTION OF THE SPECIFIC EMBODIMENTS

Composting is typically the single most important process in the production of mushrooms in commercial systems. Most growing-related problems can be traced to inadequate compost. However, composting is also generally the least understood part of the growing process due to composting being a complex solid-state biological fermentation coupled with few external controls. The composting precedure must not only produce compost, but the compost must be particularly suitable for mushroom production. Historically, changes in the composting method used for producing mushroom growth substrates have been trial and error processes since it has been impossible to predict the effect of any given change on the suitability of the complex solid fermentation process.

The present invention has arisen out of a study into means for standardizing, shortening, and reducing the complexity of the composting process. The new composting process, which ultimately forms a part of the process of growing mushrooms, uses as a starting material straw or other cellulosic media that have been chemically ammoniated by a process that chemically modifies cellulose and other components of the medium with ammonia. This process and starting material differs significantly from prior art processes in which various soluble nitrogen sources, including ammonium compounds (but not ammonia), were used as a nutrient source for the biomass in the solid-state fermentation process. Ammoniation is a specific chemical process in which free, generally gaseous, ammonia reacts chemically to break some chemical bonds present in the cellulosic material and form new ones in which the ammonia becomes chemically bound to the biopolymers of the cellulosic material.

The present composting and mushroom growing processes have been shown to be commercially viable despite prior art teachings which indicated that the presence of ammonia could be detrimental to the mushroom growing process. Gaseous ammonia is poisonous to mushrooms, and it was necessary to determine that no gaseous ammonia remained in the compost and that significant extra amounts of ammonia were not released from some labile from before it could be determined that the process was suitable for the production of a mushroom growth substrate.

Compost has now been produced by the method of the invention and used in the production of mushrooms. In an exemplary fermentation and mushroom production process using wheat straw as the cellulosic medium, a 67% reduction in preconditioning time and a 37% reduction in total outdoor composting time (preconditioning plus Phase I) has been obtained. Pilot plant yields on compost made with ammoniated straw were statistically equivalent to yields on commercial substrate prepared by the previously used process.

The raw materials used in the composting and mushroom growing processes of the invention can vary considerably and are generally selected from locally available organic wastes on economic considerations. Cereal straw (e.g., wheat, oats, barley, rice) usually forms the bulk of the raw materials, but alternatives, including corn cobs, sugar-cane bagasse, coconut wastes, hay, vegatable wastes, and cotton wastes, are used according to local supply. Shiitake mushrooms (*Lentinus edodes*) are generally grown on woody materials, such as sawdust, wood chips, or solid wooden logs.

Because of the wide variety of physical and chemical properties of the different starting materials, it is difficult to compare composting methods that use different raw materials. Even with a preferred substrate such as wheat straw, different cultivars can vary the composting procedure significantly. For example, wheat cultivars with thick-walled straw and pithy centers are preferred to those with thin-walled straw and hollow centers. The latter straws generally remain flacid and can become compacted and waterlogged, increasing the likelihood of undesirable anaerobic decomposition occurring during the aerobic composting process. Biodegradability of straws can also vary. Furthermore, geographical, environmental, and harvesting factors can be important in determining the structure and chemistry of straws and hence their ability to be composted. For example, late harvesting reduces the yield of straw and increases fiber content at the expense of crude protein. If baled wet or stored in damp conditions, straw can also decompose as a result of fungal breakdown prior to the composting process. In addition, stable bedding can contain varying amounts of horse droppings and urine and be of various ages.

Although all of the factors mentioned above can vary the time required for composting an individual material, the process of the present invention can be used with any organic waste normally used in the production of mushroom growth substrates to shorten the composting time and/or provide the other enumerated advantages. However, the advantages may not be apparent if a particular composting procedure of the invention is compared to a different composting procedure using different raw materials or significant variations in the composting steps. Nevertheless, experiments have demonstrated that using ammoniation as an initial conditioning step for the raw material used in composting reduces preconditioning time and total composting time of the normal outdoor composting processes. Naturally, the most significant advantages are seen in processes in which the starting material requires significant conditioning prior to entering Phase I composting. Lesser improvement is expected with materials that normally require less preconditioning, such as stable bedding which is already partially decomposed and mechanically broken by the action of animal's hooves. Furthermore, since stable bedding can vary significantly in its composition, it may be difficult to compare one fermentation with another in such processes, particularly if they are carried out in different locations and/or at different times. However, even using variable starting materials, certain advantages are retained. These include the sterilization that occurs during the ammoniation process, which provides a reduction in competing bacteria and other microorganisms that do not provide the most advantageous composting microflora. Introduction of desirable composting microorganisms can thus be more readily accomplished.

The ammoniation process itself is usually carried out on the raw material prior to the preconditioning or Phase I steps of the normal composting process. However, ammoniation can occur concurrently with the initial stages of composting. Straw and other organic wastes have previously been treated with ammonia for other purposes, particularly for use in livestock feed. Accordingly, the techniques of ammoniation of organic wastes has been well developed. Various methods used include treatment in the field in stacks covered with plastic or other types of covers using 3% ammonia gas or ammonia water (evacuation of air in the stack before adding ammonia has been carried out in some cases), treatment in farm silos with 3% ammonia gas (optionally after pre-treatment with diluted acid solutions), and treatment in a sealed container with ammonia gas (optionally under pressure and/or with heat). Depending on the process used, time required to raise the nitrogen content of the organic waste varies significantly. At ambient temperatures available in a field and using stacks of straw with plastic (which vary significantly in efficiency of retaining ammonia), a satisfactory effect can generally be obtained with a treatment of 10–30 days. If the reaction is carried out with heat in a sealed container, reaction times of 24 hours or less are common. Commercial sealable steel containers designed for the ammoniation of baled straw and other cellulosic materials are available.

A useful technique comprises ammoniating straw prior to long-term storage, either in the field or upon receipt of the straw at a composting location for storage. Such treatment prevents fungal breakdown during storage. An occasionaal flushing with a small amount of ammonia during storage helps to maintain the structure of the straw.

Because of the great variations in technique that can achieve satisfactory results, the treatment is better defined in terms of the result of the operation on the nitrogen content of the organic waste than by the specific conditions under which the waste is treated. Any ammoniation sufficient to increase the content of covalently bound nitrogen will reduce the preconditioning time at least to some extent. Reduction of preconditioning time by at least 20%, more preferably 50%, is desirable while providing an equally good compost (compared to compost prepared identically but using an equivalent amount of a different supplemental nitrogen source, such as urea). It is preferred to increase the nitrogen content to a level approximating that which is normally present at the end of the Phase I composting process (i.e, after nitrogen has been added by bacterial action) for non-ammoniated processes. This level is typically about 1.7% nitrogen but can vary from about 1.3 to about 2.0% nitrogen. In contrast, wheat straw has an initial nitrogen content of about 0.5 to 0.8%. The ammoniation process also increases wettability of straw, although this is more difficult to measure quantitatively.

The chemical reactions that take place in ammoniation are complex and not fully understood. A 1986 report (Barton et al., *Animal Feed Science and Technology* (1986) 15:189–196) indicates that the binding takes place to carbohydrate, at least in barley straw, but does not indicate whether reaction with other biopolymers also occurs. Infra-red spectra of ammoniated barley straw showed a characteristic absorption for N—H stretching in unsubstituted amides ($RCONH_2$). A decrease in absorption in the regions normally absorbed by cellulose was also seen, indicating that cellulose was being chemically degraded, possibly by the breakdown of acetal linkages.

Once an organic waste has been ammoniated, it may be carried forward in a normal composting process. Various additives can be used for their usual purposes, although high-nitrogen additives intended for increasing the nitrogen content of the compost will not be required to the extent that would be required if the starting material was not ammoniated. Examples of additives include gypsum, denatured protein (typically a vegetable protein treated with formaldehyde), and peat.

There is no need to change the actual processing steps of the composting procedure when using the ammoniated starting material of the invention. However, the time required for the various stages will typically be reduced, as shown in the examples which follow. Using the procedures described herein, preconditioning phases of no more than 8 days for straw of a previous season (6 months old or older) and no more than 11 days for freshly harvested straw can be used in providing a satisfactory mushroom compost. Phase II composting, preparation of mushroom beds, spawning, and harvesting of flushes will not be affected by the present invention.

A wide variety of mushrooms can be grown on compost prepared by the techniques of the present invention, including *Agaricus brunnescens* Peck c *Agaricus bisporus* (Lange) Imbach (cultivated mushroom), *A. campestris*, *A. bitorquis*, *A. edulis*, *A. augustus*, *Armillaria mellea*, *Pleurotus ostreatus*, *Volvariella volvacea*, *Coprinus comatus*, *Coprinus comatus*, *Morchella esculenta*, *M. angusticeps*, *M. conica*, *M. crassipes*, *Lentinus edodes*, and other edible fungi. U.S. Pat. No. 4,594,809 describes substrates for the cultivation of species of the genus Morchella, which can be modified by the techniques of the present invention. Additionally, the techniques described in U.S. Pat. No. 4,127,965 for the cultivation of Shiitake and similar forest mushrooms can be modifed by ammoniating the starting materials described therein.

It should be noted that a mushroom bed comprising mushrooms and a compost prepared from an ammoniated cellulosic material is different chemically from known mushroom beds and also constitutes a part of the present invention.

The invention now being generally described, a more complete understanding can be obtained by reference to the following specific examples, which are included for purposes of illustration only and are not intended to be limiting unless otherwise specified.

EXAMPLE 1

Ammoniation of Straw and Use in Preparing Composting

Baled wheat straw was ammoniated using a commercial sealed tank manufactured by FMA, a Danish agricultural equipment manufacturing firm. The ammoniator is a large hexagonal tank with a sealable door that is equipped with an electric heater and means for supplying gaseous ammonia to the interior of the tank. The tank, which rests on one of the hexagonal sides, is approximately 2.5 meters in length with an interior capacity of about 12.0 cubic meters.

The straw available for testing consisted of standard rectangular bales. The tank, which is specifically designed for use with large round bales, was filled by hand with the smaller bales. The capacity of the tank was about one ton. After filling, the tank was closed and sealed and then dosed with 3% ammonia (calculated on a weight basis to the weight of the straw). The ammoniator was then heated at approximately 90°–95° C. for 15 hours to produce the ammoniated straw.

In a test run in which 3 tons of bale straw were ammoniated, a nitrogen value for covalently bound nitrogen was obtained approximately equal to that normally present after a 21-day preconditioning period.

|  | % Nitrogen (N) | % Ash |
|---|---|---|
| Bale Straw: |  |  |
| Non-ammoniated Straw | 0.90 | 8.1 |
| Ammoniated Straw | 1.62 | 9.3 |

The ammoniated straw was then used in the commercial composting procedure described in the background section of this specification except that the preconditioning phase lasted 18 days versus the conventional 21 days. The ricked phase (Phase I) lasted 9 days with Phase II lasting 6 days. Miniricks 20–40 feet in length were used for test composts. Commercial ricks were identical in height and width but were about 500 feet in length. Conventional rates of supplementation were used in both cases following the schedule set forth in Table 1A below, in which Day 0 is the day on which the compost was prepared in ricks for Phase I composting. Table 1B shows a different supplementation schedule used in Example 4.

TABLE 1A

Commercial Supplementation/Turning Schedule Per Crop (For Examples 1-3)

| Day | Supplements | Pounds |
|---|---|---|
| −4 | Cotton Seed Hulls | 7000 |
|  | Dried Poultry Waste | 2100 |
|  | Cocoa | 4000 |
|  | Almond Hulls | 3000 |
| −2 | Cotton Seed Hulls | 6580 |
|  | Dried Poultry Waste | 750 |
|  | Cocoa | 1000 |
|  | Grape Pumice | 5000 |
| 0 | No Supplements - Layout |  |
| 2 | Cotton Seed Hulls | 6580 |
|  | Dried Poultry Waste | 750 |
|  | Cocoa | 1000 |
| 4 | Grape Pumice | 10000 |
| 6 | Cotton Seed Meal | 8000 |
|  | Gypsum | 7000 |
| 8 | Cotton Seed Meal | 8000 |
|  | Gypsum | 7000 |
| 10 | Final Turn |  |
|  | No Supplements |  |
| 11 | Fill |  |

TABLE 1B

Commercial Supplementation/Turning Schedule Per Crop (For Example 4)

| Day | Supplements | Pounds |
|---|---|---|
| −6 | Cotton Seed Hulls | 3500 |
|  | Dried Poultry Waste | 970 |
|  | Cocoa | 920 |
|  | Almond Hulls | 1500 |
| −4 | Cotton Seed Hulls | 3500 |
|  | Dried Poultry Waste | 970 |
|  | Cocoa | 920 |
|  | Almond Hulls | 1500 |
| −2 | Cotton Seed Hulls | 6580 |
|  | Dried Poultry Waste | 1040 |
|  | Cocoa | 920 |
|  | Grape Pumice | 4600 |
| 0 | Cotton Seed Hulls | 4580 |
|  | Dried Poultry Waste | 700 |
|  | Cocoa | 920 |
| 2 | Cotton Seed Hulls | 2000 |
|  | Grape Pumice | 9200 |
| 4 | Cotton Seed Meal | 7650 |
|  | Gypsum | 6990 |
| 6 | Cotton Seed Meal | 5850 |
|  | Gypsum | 6840 |
| 8 | No Supplements |  |
| 10 | Final Turn |  |
|  | No Supplements |  |
| 11 | Fill |  |

Analytical samples were taken at postfill and prespawn stages.

|  | Postfill | | Prespawn (Post Phase II) | |
|---|---|---|---|---|
| Percent | Ammon'd | Comm'l | Ammon'd | Comm'l |
| N | 2.15 | 1.99 | 2.66 | 2.48 |
| H$_2$O | 74.00 | 68.70 | 70.60 | 64.10 |
| Ash | 19.50 | 21.20 | 25.70 | 23.20 |
| Fats | 1.46 | 1.93 | 1.56 | 1.53 |

|  | DWT/ft$^2$ | SBM (Soybean Meal) at Spawn |
|---|---|---|
| Ammoniated Straw | 5.39 lbs | 1.35% |
| Commercial | 6.30 | 2.70% |

"Greenness" is a term of art in composting. Compost passes from an earlier "green" stage at which the raw material organic waste has its normal, uncomposted appearance to a more mature compost state, in which the composted organic raw material darkens, becomes more pliable, and is better able to hold water.

As shown in the table immediately above, the compost prepared from ammoniated straw was supplemented at spawn with denatured protein at 50% of a conventional supplement rate because of concern over residual ammonia in this initial test. Despite this lesser rate of supplementation, which normally reduces yield, the enzyme laccase (assayed throughout spawn run) showed statistically insignificant differences between the conventionally produced compost and the ammoniated straw compost. Laccase activity has been shown to correlate with *A. bisporus* mycelial biomass. Although no yield data were collected in this first ammoniation experiment, the ammoniated straw crop and a conventionally produced crop growing in the same production room appeared similar. Accordingly, this initial test demonstrated that ammoniated straw did not have the feared effect of excess free or labile ammonia interfering with crop production.

EXAMPLE 2

Crop Response for Ammoniated Straw Compost Prepared with Shortened Precondition Time vs. Commercial Compost Ammoniated straw was prepared as in Example 1, and preconditioning supplements (Table 1A) were added immediately after bale break. This resulted in a shortened preconditioning stage (11 days) prior to entering the normal composting Phase I and Phase II stages. The raw material and preconditioning timing steps are set forth in the following table.

|  | Ammoniated Straw | Commercial | |
|---|---|---|---|
| Bale Break |  |  |  |
| % N Added | 2.5% (ammonia) | 0.95% (urea) |  |
| % N (Kjeldahl) | 1.69 | 1.78 |  |
| Preconditioning (PC) |  |  |  |
| Supplementation Schedule (Days after bale break) | 2 | 17 | −4 Day Supplements[1] |
|  | 4 |  | 19 −4 Day Supplements[1] |
| Total Time in PC (day) | 11 | 21 |  |

[1]See Table 1A

Phase I temperatures were similar for ammoniated straw compost and commercial-process compost. Supplements were added to the minirick at commercial rates, except for cottonseed meal, which was added at half the rate (due to a relatively high 1.86 N value at build) on Day +4. The supplements normally added on Phase I Day 0 were not added until Day +2, and the gypsum supplementations were put on at Day +2 and +4. By Day +9 in Phase I, the minirick straw was not as broken down as the commercial stack. Consequently, half the minirick was filled into trays on Day +9 and half was left to compost two more days before filling.

|  | Ammoniated Straw | | Commercial | |
|---|---|---|---|---|
| At Fill | Day 9 | Day 11 | Crop 007 | Crop 009 |
| % N | 2.00 | 2.17 | 2.22 | 2.3 |
| % Ash | 21.70 | 22.50 | 20.70 | 20.8 |

-continued

|  | Ammoniated Straw | | Commercial | |
| --- | --- | --- | --- | --- |
| At Fill | Day 9 | Day 11 | Crop 007 | Crop 009 |
| % H$_2$O | 70.90 | 72.10 | 69.70 | 69.8 |

Both ammoniated fills cleared ammonia (less than 0.1% w/w) in Phase II. Post-phase II 11+9 (that is, 11 days in preconditioning, 9 days in Phase I compost; two trays) compost was held cool under plastic fro 2 while the 11+11 compost was finishing its respective Phase II. Control compost in this test was from wall trays. Both 11+11 and 11+9 were placed on the wall in Phase II.

On the day of spawning, pre-spawn moisture was estimated in each compost with duplicate 20 gram samples in a microwave oven. Eighty-five pounds of compost DWT per treatment were weighed out.

The following treatments were split out at spawning for pilot plant cropping:

| Treatment | Compost | Spawn Supplement |
| --- | --- | --- |
| T1 | Crop #009 (control A) | — |
| T2 | Crop #009 (control B) | SBM |
| T3 | Ammoniated straw, 11 + 11 | — |
| T4 | Ammoniated straw, 11 + 11 | SBM |
| T5 | Ammoniated straw, 11 + 9 | — |

T1 and T2 treatment compost consisted of commercial control material: 170 lbs DWT were weighed into a single pile and formed into a long windrow. First, Dimilin was sprayed (46.6 g in 0.6 gal H$_2$O = high labeled rate) with a Hudson-type sprayer while the compost was being hand-turned with a fork for good coverage. Hand-turning continued while water was added via hose—about 8 gal, calculated to bring compost up to a 69% target H$_2$O. Finally, spawn was mixed in 14×8 oz cups, which approximates the commercial rate of 0.7 bags per tray. At this point, the compost was split into two equal piles (by weight) and soybean meal supplement (3% wt/DWT rate: 1158 grams) was turned into one of the piles (T2). Trays were filled to 37.8 lbs net weight, six trays per treatment.

Compost for T3 and T4 was taken from two trays selected at random from the 11+11 ammonia-treated synthetic group, and treated similarly to T1 and T2, respectively.

Compost was weighed out for T5 and sprayed with 23.3 Dimilin (at the same labeled rate as above), filled to 37.2 lbs DWT and treated similarly otherwise to treatments above.

Analytical values at spawn were as follows:

| Trtmnt | Control | Supp | % H$_2$O | % N | % Ash |
| --- | --- | --- | --- | --- | --- |
| T1 | Crop #009 (control A) | — | 68.6 | 2.12 | 22.0 |
| T2 | Crop #009 (control B) | SBM | 68.6 | 2.33 | 22.8 |
| T3 | Ammon. straw, 11 + 11 | — | 69.4 | 2.34 | 26.8 |
| T4 | Ammon. straw, 11 + 11 | SBM | 69.4 | 2.33 | 24.4 |
| T5 | Ammon. straw, 11 + 9 | — | 68.2 | 2.26 | 22.5 |

Spawn run temperatures were slightly warmer in T1 than in T3 and T5, and T4 averaged about 4 degrees cooler than T2. Laccase values were not significantly different among T1, T3, and T5 or between T2 and T4.

| Compost Laccase Activities at Case and at Flushing | | | |
| --- | --- | --- | --- |
| | | Laccase Activity (1 min/1 ml/100 g) | |
| Treatment | Description | At Case | At Flushing |
| T1 | Comm'l, −SBM | 92.0 | 255.7 |
| T3 | 11 + 11, −SBM | 92.2 | 253.2 |
| T5 | 11 + 9, −SBM | 97.4 | 223.1 |
| T2 | Comm'l +SBM | 182.2 | 286.7 |
| T4 | 11 + 11, +SBM | 136.9 | 248.5 |

Standard error 13.1 (equality of variance at the two sampling periods not tested).

Mycelium on all trays was up for flushing on the same day, and first break was fairly synchronous among the treatments. Yields for ammoniated straw with a shortened preconditioning time vs. commercially prepared compost, with and without soybean meal (SBM) at spawn, were as follows:

| | | Yield (lb/sq ft) | | | |
| --- | --- | --- | --- | --- | --- |
| Treatment | Description | 1st Br | 2nd Br | 3rd Br | Total |
| T1 | Comm'l, −SBM | 1.70 | 2.89 | 0.97 | 5.55 |
| T3 | 11 + 11, −SBM | 1.23 | 2.44 | 1.39 | 5.05 |
| T5 | 11 + 9, −SBM | 1.32 | 2.11 | 0.96 | 4.38 |
| T2 | Comm'l, +SBM | 1.56 | 2.76 | 1.17 | 5.48 |
| T4 | 11 + 11, +SBM | 1.84 | 2.77 | 1.33 | 5.96 |

Note:
Standard error = 0.28 lb/sq ft.

The sizing data also suggests a normal effect on pinset and growout. Lower yielding beds produced larger mushrooms having greater economic value so that the economic yield variation was less than would be apparent from the weight yield.

| | | Sizing (%) | | | |
| --- | --- | --- | --- | --- | --- |
| Treatment | Description | Small | Medium | Large | No2s |
| T1 | Comm'l, −SBM | 25.1 | 35.3 | 36.3 | 3.3 |
| T3 | 11 + 11, −SBM | 13.6 | 28.5 | 55.1 | 2.8 |
| T5 | 11 + 9, −SBM | 16.3 | 32.3 | 49.7 | 1.7 |
| T2 | Comm'l, +SBM | 17.5 | 34.6 | 44.9 | 3.0 |
| T4 | 11 + 11, SBM | 11.8 | 34.0 | 49.7 | 4.5 |

Standard errors are as follows: Small, 3.7%; Medium, 3.3%; Large, 6.4% (No2s not normally distributed).

In conclusion, it can be seen that ammoniated straw with a shortened preconditioning period can give a respective commercial crop.

EXAMPLE 3

Shortened Precondition Times With and Without Ammoniation

After determining that a useful crop could be obtained using ammoniated straw as a raw material, we tested whether ammoniation was necessary to shorten the preconditioning process. To do this, we treated ammoniated and non-ammoniated bales identically: same time, supplements, and watering criteria throughout preconditoning (12 d) and Phase I (9 d).

| Bale Break | Ammoniated Straw | Commercial |
| --- | --- | --- |
| % N Added | 1.7% (ammonia) | 0.95% (urea) |
| % N (Kjeldahl) | 1.40 | 1.68 |

The rate of ammonia application was reduced to 2% in this test after observing an above-average N value at ricking in the previous test.

Supplement materials and rates were those used commercially. Preconditioning supplements were added at the same time-points as in the previous test and Phase I supplements were added at time-points as per usual commercial practice (Table 1A).

The untreated straw ran about 30° F. cooler through most of preconditioning and Phase I. The lack of thermogenesis gave a much longer and greener compost at fill as indicated by ash values shown below. The ammoniated straw, on the other hand, looked only slightly more green than the commercial control compost. In fact, the untreated straw was considered by all farm personnel who saw it unfit to fill, whereas the ammoniated material was considered to appear useful. The analytical values (particularly ash) reflect this subjective evaluation.

| Compost | % H$_2$O | % N | % Ash | % NH$_3$ | pH |
|---|---|---|---|---|---|
| Postfill: | | | | | |
| Commercial rick | 69.0 | 1.97 | 20.6 | — | — |
| Untreated minirick | 72.6 | 1.94 | 17.9 | — | — |
| Ammoniated minirick straw | 71.8 | 1.91 | 20.5 | — | — |
| Prespawn (Post Phase II): | | | | | |
| Commercial rick | 66.0 | 2.50 | 26.2 | 0.12 | 7.96 |
| Untreated minirick straw | 69.6 | 2.41 | 20.1 | 0.03 | 7.28 |
| Ammoniated minirick straw | 68.3 | 2.60 | 23.8 | 0.07 | 7.52 |

The pilot plant corpping consists of the following treatments:

| Treatment | Compost | Spawn Supplement |
|---|---|---|
| T1 | Commercial (crop #43) | — |
| T2 | Commercial (crop #43) | SBM |
| T3 | Untreated minirick straw | — |
| T4 | Ammoniated minirick straw | — |
| T5 | Ammoniated minirick straw | SBM |

A treatment with SBM and untreated straw was not included to increase replication for comparisons of more interest. The methods of spawning and treatment preparation were similar to that described for Example 1 above.

Spawn run temperatures were similar within SBM and no-SBM groups. Competitor molds were most abundant on T2, T3 and T5, appearing on virtually every tray of these treatments—a classic indication of the nonselective nature of non- or under-composted materials.

Compost laccase activities 2 days after flushing were as follows (averages of 6 samples per treatment):

| Treatment | Compost | Spawn Supp. | min/ml/100 g |
|---|---|---|---|
| T1 | Commercial | — | 251.6 |
| T4 | Ammon. Straw | — | 273.6 |
| T3 | Untreated Straw | — | 316.1 |
| T2 | Commercial | SBM | 292.4 |
| T5 | Ammon. Straw | SBM | 339.9 |

Yield data were as follows:

| Trtmnt | Compost | Spawn Supp. | Yield (lb/sq ft) 1st Br | 2nd Br | 3rd Br | Total |
|---|---|---|---|---|---|---|
| T1 | Commercial | — | 1.70 | 3.26 | 1.48 | 6.39 |
| T4 | Ammon. Straw | — | 1.74 | 3.00 | 1.15 | 5.97 |
| T3 | Untreated Straw | — | 1.77 | 2.52 | 0.57 | 4.75 |
| T2 | Commercial | SBM | 2.18 | 3.06 | 1.27 | 6.50 |
| T5 | Ammon. Straw | SBM | 2.29 | 2.85 | 1.11 | 6.30 |

EXAMPLE 4

Dry vs. Wet Straw Ammoniation

In this test we ran half (6 tons) of our test straw through the box dry (7.5% H$_2$O) and the other half wetted to about double (14.0% H$_2$O) moisture in the bale, alternating box runs of each type. Samples of each run through the box have been taken to obtain data to help us answer the question about the way the ammonia is incorporated into the straw—that is, whether it is absorbed or covalently bound. Those values are tabulated below.

| Compost | % H$_2$O | % N | % Ash | % NH$_3$ | pH |
|---|---|---|---|---|---|
| Postfill: | | | | | |
| Commercial rick | 72.6 | 1.98 | 21.2 | 0.40 | 8.13 |
| Ammoniated dry straw minirick | 74.0 | 2.23 | 18.9 | 0.48 | 7.97 |
| Ammoniated moist straw minirick | 73.1 | 2.10 | 21.6 | 0.46 | 8.07 |
| Prespawn (Post Phase II): | | | | | |
| Commercial rick | 68.8 | 2.37 | 23.8 | 0.00 | 7.90 |
| Ammoniated dry straw minirick | 71.2 | 2.67 | 21.4 | 0.06 | 7.62 |
| Ammoniated moist straw minirick | 71.8 | 2.73 | 23.5 | 0.00 | 7.34 |

The pilot plant cropping consists of the following treatments:

| Treatment | Compost | Spawn Supplement |
|---|---|---|
| T1 | Commercial (Crop #8702) | — |
| T2 | Commercial (Crop #8702) | SBM |
| T3 | Ammoniated dry straw | — |
| T4 | Ammoniated dry straw | SBM |
| T5 | Ammoniated moist straw | — |
| T6 | Ammoniated moist straw | SMB |

| | Ammoniated Straw | Commercial |
|---|---|---|
| Bale Break | | |
| % N Added Preconditioning (PC) | 2% | 0.95% (urea) |
| Supplementation Schedule (Days after bale break) | 2 | 15 —6 Day[1] |
| | | 17 —4 Day (see Table 1B) Supplements |
| | 4 | 19 —4 Day (see Table 1B) Supplements |
| Total Time in PC (day) | 6 | 21 |
| Total Time in Phase I (day) | 12 | 9 |
| Total Days | 18 | 30 |

[1]See Table 1B for supplements

Supplement materials and rates were those used commercially. Preconditioning supplements were added at the same time-points as in the previous test and Phase I supplements were added at time-points as per usual practice (Table 1B).

This crop was spawned with Camsco M8. Spawn run temperatures were higher in the premoistened straw than in the dry straw treatments (see FIGURE). Unsupplemented control compost (T1) was the most thermogenic of the six composts during most of spawn run, whereas supplemented control compost (T2) gave the greatest temperature spike during late spawn run.

Compost laccase activities 2 days after flushing were as follows (averages of 6 samples per treatment):

| Treatment | Compost | Spawn Supp. | min/ml/100 g |
|---|---|---|---|
| T1 | Commercial | — | 287.8 |
| T3 | Ammon. dry straw | — | 277.8 |
| T5 | Ammon. moist straw | — | 344.9 |
| T2 | Commercial | SBM | 298.5 |
| T4 | Ammon. dry straw | SBM | 340.7 |
| T6 | Ammon. moist straw | SBM | 371.8 |

Yields are shown below:

| Trtmnt | Compost | Spawn Supp. | Yield (lb/sq ft) 1st Br | 2nd Br | 3rd Br | Total |
|---|---|---|---|---|---|---|
| T1 | Commercial | — | 2.15 | 2.87 | 1.16 | 6.18 |
| T3 | Ammon. dry | — | 2.29 | 2.35 | 0.71 | 5.35 |
| T5 | Ammon. moist | — | 2.48 | 2.82 | 0.98 | 5.30 |
| T2 | Commercial | SBM | 2.00 | 3.59 | 0.99 | 6.58 |
| T4 | Ammon. dry | SBM | 2.54 | 2.92 | 0.80 | 6.26 |
| T6 | Ammon. moist | SBM | 2.25 | 2.55 | 1.04 | 5.84 |

All publications mentioned in this specification are indicative of the level of skill of those skilled in the art to which this invention pertains. All publications are herein incorporated by reference to the same extent as if each individual publication was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. In a process of growing mushrooms in a composted medium prepared from a cellulosic material, an improvement which comprises:
    using as said cellulosic material a chemically ammoniated cellulosic material prepared by reacting free ammonia with said cellulosic material to form chemical bonds with said cellulosic material.

2. The process of claim 1, wherein said cellulosic material is sawdust, wood chips, bagasse, hay, cereal straw, chopped or shredded vegetable waste, or a combination of said cellulosic materials.

3. The process of claim 2, wherein said cellulosic material is a cereal straw.

4. The process of claim 3, wherein said straw is wheat straw.

5. The process of claim 4, wherein said straw has a fixed nitrogen content of at least 1.2% after ammoniation and no more than 0.8% prior to ammoniation.

6. The process of claim 1, wherein said cellulosic material is composted in the substantial absence of nitrogen sources other than said ammoniated cellulosic material.

7. The process of claim 4, wherein said cellulosic material is composted in the presence of a supplemental nitrogen source, wherein said supplemental nitrogen source provides no more than 0.6% nitrogen to said fermentation.

8. The process of claim 1, wherein said ammoniated cellulosic material is composted using a preconditioning phase lasting at least 20% less than the time required for preconditioning in production of compost from otherwise identical starting materials and composting procedures but using a non-ammoniated cellulosic material instead of said amoniated cellulosic material.

9. The process of claim 8, wherein said ammoniated cellulosic material is composted using a preconditioning phase lasting at least 50% less than said time for said non-ammoniated cellulosic material.

10. In a process for preparing a cellulosic material for use in a mushroom mycelium growth medium, an improvement comprising:
    chemically ammoniating said cellulosic material by reacting free ammonia with said cellulosic material to form chemical bonds with said cellulosic material; and
    composting said ammoniated cellulosic material to produce a mushroom mycelium growth medium.

11. The process of claim 10, wherein said cellulosic material is sawdust, wood chips, bagasse, hay, cereal straw, chopped or shredded vegetable waste, or a combination of said cellulosic materials.

12. The process of claim 11, wherein said cellulosic material is a cereal straw.

13. The process of claim 10, wherein said ammoniating comprises contacting said cellulosic material with gaseous ammonia.

14. The process of claim 13, wherein said contacting takes place in the presence of externally added heat energy.

15. The process of claim 10, wherein said composting comprises outdoor preconditioning and Phase I solid-state fermentation steps.

16. The process of claim 15, wherein preconditioning is carried out in the substantial absence of nitrogen sources other than said ammoniated cellulosic material.

17. In a process of preparing a cellulosic material for use as mushroom growth medium comprising the steps of composting cereal straw in the substantial absence of animal waste products, an improvement which comprises:
    chemically ammoniating said straw prior to said composting by reacting free ammonia with said cellulosic material to form chemical bonds with said cellulosic materials; and
    composting said straw in the substantial absence of animal waste products.

18. The process of claim 17, wherein said composting comprises preconditioning, Phase I, and Phase II stages.

19. The process of claim 18, wherein said proconditioning stage occurs in the substantial absence of soluble nitrogen sources.

20. The process of claim 17, wherein the minimum time necessary to complete the preconditioning phase of said composting to provide a satisfactory mushroom growth medium is at least 20% less than the minimum time required to produce a satisfactory mushroom growth medium by an identical process using unammoniated straw.

21. A mushroom bed, comprising:
    mushrooms; and
    a composted chemically ammoniated cellulosic material prepared by reacting free ammonia with said cellulosic material to form chemical bonds with said cellulosic material.

22. The mushroom bed of claim 21, wherein said composted material is prepared by chemically ammoniating a cellulosic material prior to initiation of composting of said ammoniated cellulosic material.

23. The mushroom bed of claim 22, wherein said cellulosic material is wheat straw.

* * * * *